US009576541B2

(12) United States Patent
Chung et al.

(10) Patent No.: US 9,576,541 B2
(45) Date of Patent: Feb. 21, 2017

(54) VISION INSPECTION APPARATUS AND METHOD OF COMPENSATING GAMMA DEFECT AND MURA DEFECT THEREOF

(71) Applicant: SAMSUNG DISPLAY CO., LTD., Yongin, Gyeonggi-Do (KR)

(72) Inventors: Jae-Seob Chung, Asan-si (KR); Hoi-Sik Moon, Asan-si (KR); Kang-Hyun Kim, Seoul (KR); Jong-Hee Na, Asan-si (KR); Woo-Jin Jung, Seoul (KR); Jung-Suk Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 122 days.

(21) Appl. No.: 14/681,015

(22) Filed: Apr. 7, 2015

(65) Prior Publication Data

US 2016/0148582 A1 May 26, 2016

(30) Foreign Application Priority Data

Nov. 21, 2014 (KR) ........................ 10-2014-0163618

(51) Int. Cl.
*H04N 17/00* (2006.01)
*G09G 3/36* (2006.01)

(52) U.S. Cl.
CPC ..... *G09G 3/3611* (2013.01); *G09G 2320/0673* (2013.01); *G09G 2360/145* (2013.01)

(58) Field of Classification Search
CPC ...... H04N 17/00; H04N 17/04; H04N 17/004; H04N 5/20; H04N 5/202; H04N 9/69; G06G 3/3611; G06G 3/3607; G06G 3/3406; G06G 3/006; G06G 2320/0233; G06G 2320/0693; G06G 2320/0276; G06G 2320/0673; G06G 2360/145
USPC 348/180, 189, 191, 671, 674, 687; 345/690; 382/169, 274, 275
IPC .................. H04N 17/00,5/14, 5/202, 5/57, 9/69
See application file for complete search history.

(56) References Cited

U.S. PATENT DOCUMENTS

2013/0141409 A1 6/2013 Kosei
2015/0070403 A1* 3/2015 Kim ..................... G09G 3/3607 345/690

FOREIGN PATENT DOCUMENTS

| | | | |
|---|---|---|---|
| JP | 2000-209603 | A | 7/2000 |
| KR | 10-2012-0092982 | A | 8/2012 |
| KR | 10-2014-0000705 | A | 1/2014 |
| KR | 10-2014-0054750 | A | 5/2014 |
| KR | 10-2014-0067394 | A | 6/2014 |
| KR | 10-2014-0093011 | A | 7/2014 |
| KR | 10-2015-0030013 | A | 3/2015 |
| KR | 10-2015-0081085 | | 7/2015 |

* cited by examiner

*Primary Examiner* — Sherrie Hsia
(74) *Attorney, Agent, or Firm* — Lewis Roca Rothgerber Christie LLP

(57) ABSTRACT

A vision inspection apparatus includes a first luminance profile generator configured to generate a plurality of first luminance profiles corresponding to the plurality of reference grayscales, a gamma corrector configured to calculate a gamma correction value of the display apparatus using the plurality of first luminance profiles corresponding to the plurality of reference grayscales, and a second luminance profile generator configured to apply the gamma correction value to each of the plurality of first luminance profiles and to generate a plurality of second luminance profiles corresponding to the plurality of reference grayscales.

15 Claims, 6 Drawing Sheets

GRAY_INTENSITY CURVE

VISION INSPECTION APPARATUS AND METHOD OF COMPENSATING GAMMA DEFECT AND MURA DEFECT THEREOF

CROSS-REFERENCE TO RELATED APPLICATION

This application claims priority to and the benefit of Korean Patent Application No. 10-2014-0163618, filed on Nov. 21, 2014, which is hereby incorporated by reference for all purposes as if fully set forth herein.

BACKGROUND

1. Field

Exemplary embodiments of the inventive concept relate to a vision inspection apparatus and a method of compensating a gamma defect and a Mura defect. More particularly, example embodiments of the inventive concept relate to a vision inspection apparatus for simplifying compensation processes for a gamma defect and a Mura defect and a method of compensating the gamma defect and the Mura detect.

2. Description of the Related Art

In general, a liquid crystal (LC) display panel includes a lower substrate, an upper substrate opposite to the lower substrate and an LC layer disposed between the upper substrate and the lower substrate. The lower substrate includes a pixel area defining a pixel and a peripheral area receiving a driving signal which is to be applied to the pixel.

A data line, a gate line and a pixel electrode are disposed in the pixel area. The data line extends along a first direction, the gate line extends along a second direction crossing the first direction and the pixel electrode is connected to the data line and the gate line. A first driving chip pad and a second driving chip pad are disposed in the peripheral area. The first driving chip pad receives a data signal, and the second driving chip pad receives a gate signal.

The LC panel, with the LC layer disposed between the upper substrate and the lower substrate, is tested through a visual test process which tests electrical and optical operations of the LC panel. In general, the visual test process includes testing various kinds of Mura defects (e.g. spot and line Mura defects, etc.) by a tester's eyes and removing the Mura defects using a Mura defect removal algorithm based on a test result obtained by the tester's eyes. As described above, because the Mura defects are manually detected by the tester, a test process period may be relatively long and test results among different testers may be inconsistent. Thus, productivity may be decreased and compensation error may be increased.

SUMMARY

Aspects of exemplary embodiments of the inventive concept are directed toward a vision inspection apparatus for simplifying compensation processes for a gamma defect and a Mura defect.

Aspects of exemplary embodiments of the inventive concept are directed toward a method of compensating the gamma defect and the Mura defect.

According to an exemplary embodiment of the inventive concept, there is provided a vision inspection apparatus. The vision inspection apparatus includes a camera configured to capture a plurality of reference grayscale images corresponding to a plurality of reference grayscales displayed on a display apparatus, a first luminance profile generator configured to generate a plurality of first luminance profiles corresponding to the plurality of reference grayscales, a gamma corrector configured to calculate a gamma correction value of the display apparatus using the plurality of first luminance profiles corresponding to the plurality of reference grayscales, a second luminance profile generator configured to apply the gamma correction value to the plurality of first luminance profiles and to generate a plurality of second luminance profiles corresponding to the plurality of reference grayscales, and a Mura corrector configured to calculate a plurality of Mura correction values corresponding to the reference grayscales using the second luminance profiles and a plurality of target luminance profiles.

In an exemplary embodiment, the gamma corrector may be configured to generate a measured gamma curve of the display apparatus using the plurality of first luminance profiles and to calculate the gamma correction value using the measured gamma curve and a target gamma curve.

In an exemplary embodiment, the first luminance profiles corresponding to the reference grayscales may include a luminance profile of at least one selected from a horizontal direction and a vertical direction of the display apparatus.

In an exemplary embodiment, the second luminance profiles corresponding to the reference grayscales may include a luminance profile of at least one selected from a horizontal direction and a vertical direction of the display apparatus.

In an exemplary embodiment, the Mura corrector may be configured to generate a plurality of horizontal Mura correction values using the second luminance profiles of the horizontal direction corresponding to the reference grayscales and a plurality of horizontal target luminance profiles.

In an exemplary embodiment, the Mura corrector may be configured to generate a plurality of vertical Mura correction values using the second luminance profiles of the vertical direction corresponding to the reference grayscales and a plurality of vertical target luminance profile.

In an exemplary embodiment, the vision inspection apparatus may further include a memory configured to store the plurality of Mura correction values corresponding to the reference grayscales.

According to an exemplary embodiment of the inventive concept, there is provided a method of compensating a gamma defect and a Mura defect. The method includes displaying a plurality of reference grayscale images respectively corresponding to a plurality of reference grayscales on a display apparatus, generating a plurality of first luminance profiles corresponding to the plurality of reference grayscales using each of the plurality of reference grayscale images displayed on the display apparatus, calculating a gamma correction value of the display apparatus using the plurality of first luminance profiles corresponding to the plurality of reference grayscales, applying the gamma correction value to the plurality of first luminance profiles to generate a plurality of second luminance profiles corresponding to the plurality of reference grayscales, and calculating a plurality of Mura correction values corresponding to the reference grayscales using the second luminance profiles and a plurality of target luminance profiles.

In an exemplary embodiment, the calculating the gamma correction value may include generating a measured gamma curve corresponding to a central area of the display apparatus using the plurality of first luminance profiles corresponding to the plurality of reference grayscales and calculating the gamma correction value using the measured gamma curve and a target gamma curve.

In an exemplary embodiment, the first luminance profiles corresponding to the reference grayscales may include a luminance profile of at least one selected from a horizontal direction and a vertical direction of the display apparatus.

In an exemplary embodiment, the second luminance profiles corresponding to the reference grayscales may include a luminance profile of at least one selected from a horizontal direction and a vertical direction of the display apparatus.

In an exemplary embodiment, the calculating the plurality of Mura correction values may include generating a plurality of horizontal Mura correction values using the second luminance profile of the horizontal direction corresponding to the reference grayscales and a plurality of horizontal target luminance profiles.

In an exemplary embodiment, the calculating the plurality of Mura correction values may include generating a plurality of vertical Mura correction values using the second luminance profiles of the vertical direction corresponding to the reference grayscales and a plurality of vertical target luminance profiles.

In an exemplary embodiment, the method may further include storing the plurality of Mura correction values corresponding to the reference grayscale.

According to the inventive concept, a gamma compensating process for compensating a gamma difference of the display apparatus and a Mura compensating process for compensating Mura defects are performed using the plurality of reference grayscale images once captured through the camera. Thus, the gamma defect and Mura compensating processes may be simplified.

BRIEF DESCRIPTION OF THE DRAWINGS

The above and other features and advantages of the inventive concept will become more apparent by describing in detailed exemplary embodiments thereof with reference to the accompanying drawings, in which.

DETAILED DESCRIPTION

Hereinafter, the inventive concept will be explained in more detail with reference to the accompanying drawings. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present. As used herein, the terms "use," "using," and "used" may be considered synonymous with the terms "utilize," "utilizing," and "utilized," respectively.

Figure 1:
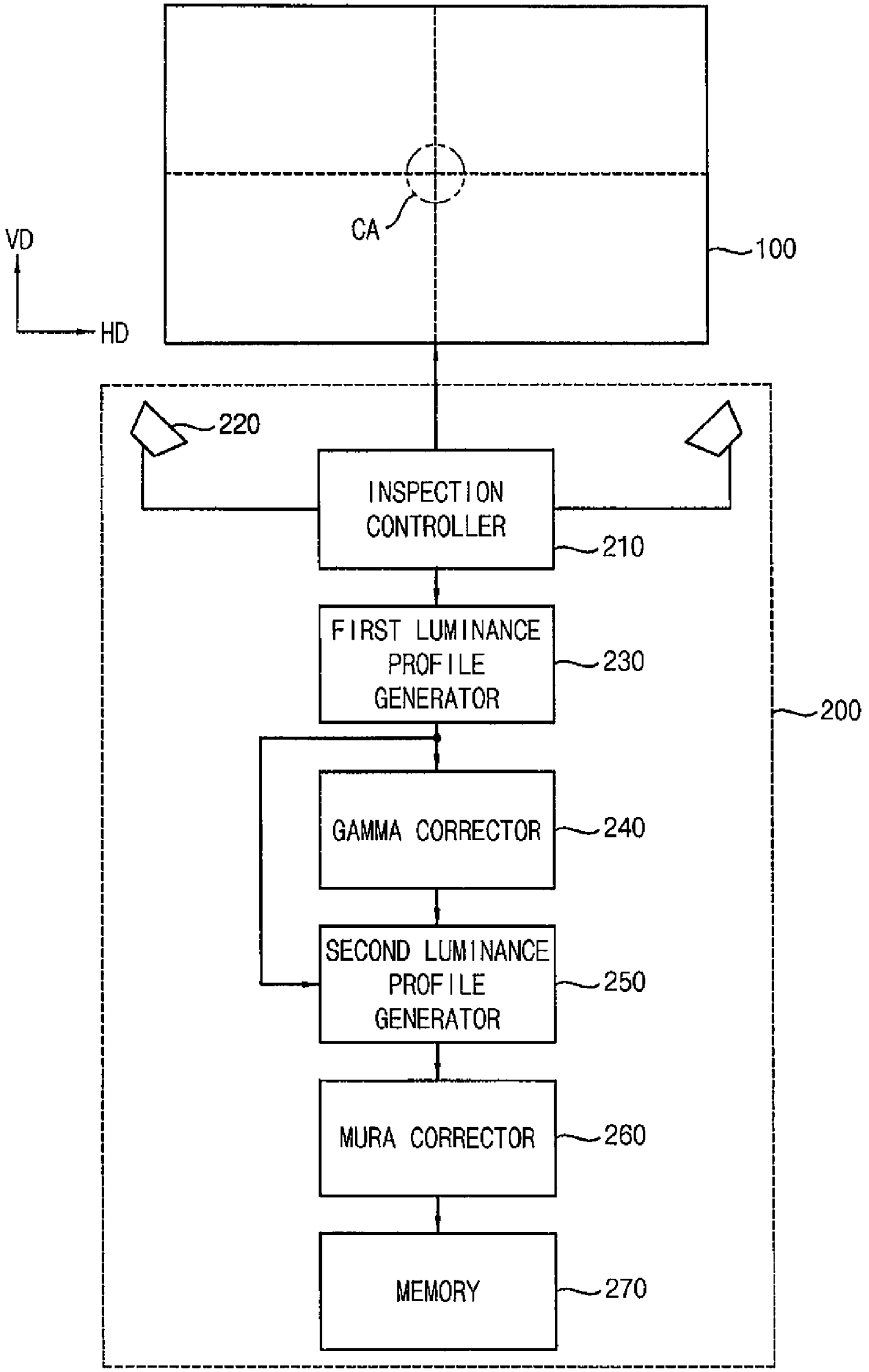
FIG. 1 is a block diagram illustrating a vision inspection apparatus according to an exemplary embodiment.

FIG. 1 is a block diagram illustrating a vision inspection apparatus according to an exemplary embodiment.

Referring to FIG. 1, the vision inspection apparatus 200 is configured to calculate a correction value for compensating a gamma defect and a Mura defect of a display apparatus 100. The correction value is correction data for correcting pixel data of the display apparatus.

The vision inspection apparatus 200 may include an inspection controller 210, a camera 220, a first luminance profile generator 230, a gamma corrector 240, a second luminance profile generator 250, a Mura corrector 260 and a memory 270.

The inspection controller 210 is configured to generally control an operation of the vision inspection apparatus 200. For example, the inspection controller 210 is configured to display a plurality of reference grayscale images corresponding to a plurality of reference grayscales sampled from total grayscales on the display apparatus (e.g., a display panel) 100. For example, the sample grayscales may include 0-grayscale, 16-grayscale, 24-grayscale, 32-grayscale, 64-grayscale, 96-grayscale, 128-grayscale, 192-grayscale and 255-grayscale with respect to a total grayscale number of 256, but not being limited thereto.

The camera 220 is configured to capture a plurality of reference grayscale images displayed on the display apparatus 100. The camera 220 may include a charge-coupled ("CCD") camera and a complementary metal-oxide-semiconductor ("CMOS") camera, for example.

The first luminance profile generator 230 is configured to analyze the plurality of reference grayscale images and to generate a plurality of first luminance profiles corresponding to the plurality of reference grayscales. The first luminance profiles may include a luminance profile corresponding to at least one selected from a horizontal direction and a vertical direction of the display apparatus 100. For example, the first luminance profile generator 230 may be configured to generate the luminance profiles of the horizontal direction for compensating vertical Mura defects such as a vertical line on the display apparatus 100, and alternatively, the first luminance profile generator 230 may be configured to generate the luminance profiles of vertical direction for compensating horizontal Mura defects such as a horizontal line on the display apparatus 100.

The gamma corrector 240 is configured to generate a measured gamma curve of a set or predetermined area in the display apparatus 100 using the plurality of first luminance profiles corresponding to the plurality of reference grayscales. For example, the gamma corrector 240 is configured to generate a measured gamma curve of a central area CA in the display apparatus 100.

The gamma corrector 240 is configured to calculate a gamma correction value of the display apparatus 100 using the measured gamma curve and a target gamma curve.

The second luminance profile generator 250 is configured to apply the gamma correction value to the plurality of first luminance profiles and to generate a plurality of second luminance profiles corresponding to the plurality of reference grayscales. Thus, the plurality of second luminance profiles is the same as a plurality of luminance profiles which is calculated by the plurality of reference grayscale images displayed on the display apparatus 100 compensating the gamma.

The plurality of second luminance profiles may include a luminance profile corresponding to at least one selected from the horizontal direction and the vertical direction of the display apparatus 100 based on the plurality of first luminance profiles generated from the first luminance profile generator 230.

The Mura corrector 260 is configured to calculate a plurality of Mura correction values corresponding to each of the plurality of reference grayscales using the plurality of second luminance profiles and a plurality of target luminance profiles.

For example, the Mura corrector 260 is configured to generate a plurality of horizontal Mura correction values corresponding to a plurality of pixel columns using the second luminance profile and the target luminance profile of the horizontal direction in order to compensate vertical Mura defects such as a vertical line. The Mura corrector 260 is configured to generate a plurality of vertical Mura correction values corresponding to a plurality of pixel rows using the second luminance profile and the target luminance profile of the vertical direction in order to compensate horizontal Mura defects such as a horizontal line.

The memory 270 is configured to store the plurality of Mura correction values corresponding to each of the plurality of reference grayscales calculated from the Mura corrector 260.

Figure 2:
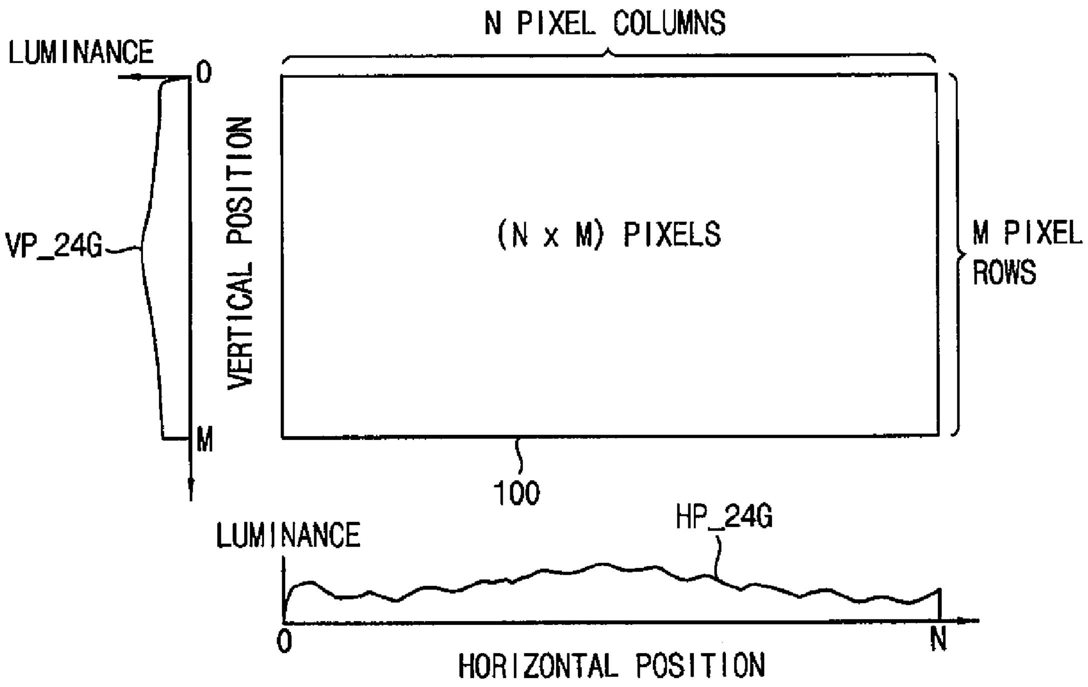
FIG. 2 is a conceptual diagram illustrating a first luminance profile generator of FIG. 1.
Figure 3:
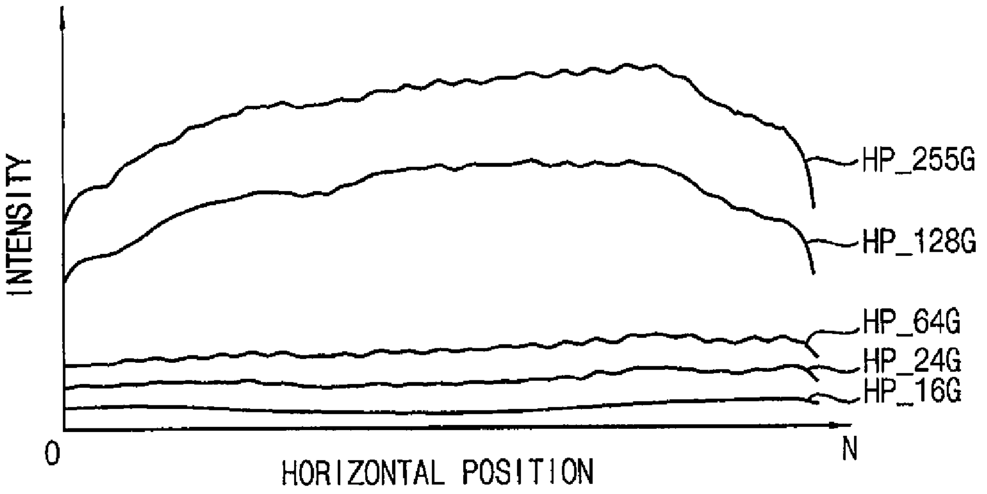
FIG. 3 is a conceptual diagram illustrating a plurality of first luminance profiles generated from the first luminance profile generator of FIG. 1.

FIG. 2 is a conceptual diagram illustrating a first luminance profile generator of FIG. 1. FIG. 3 is a conceptual diagram illustrating a plurality of first luminance profiles generated from the first luminance profile generator of FIG. 1.

Referring to FIGS. 1 and 2, the first luminance profile generator 230 is configured to generate a plurality of first luminance profiles corresponding to a plurality of reference grayscale images captured from the camera 220. Each of the plurality of reference grayscale images has an (N×M) resolution corresponding to a resolution of the display apparatus 100 (wherein, 'N' and 'M' are natural numbers).

For example, the first luminance profile generator 230 is configured to analyze a reference grayscale image of a 24-grayscale that is a reference grayscale and to generate a luminance profile HP_24G of the horizontal direction and a luminance profile VP_24G of the vertical direction corresponding to the 24-grayscale. The luminance profile HP_24G of the horizontal direction is an average luminance level of M pixels included in each of the plurality of pixel columns (N pixel columns) in the display apparatus 100. The luminance profile VP_24G of the vertical direction is an average luminance level of N pixels included in each of the plurality of pixel rows (M pixel rows). The luminance profile HP_24G of the horizontal direction is used for compensating vertical Mura defects as a vertical line in the 24-grayscale image, and the luminance profile VP_24G of the vertical direction is used for compensating horizontal Mura defects as a horizontal line in the 24-grayscale image.

As described above, as shown in FIG. 3, the first luminance profile generator 230 is configured to analyze the plurality of reference grayscale images and to generate a plurality of first luminance profiles HP_255G, . . . , HP_128G, . . . , HP_64G, HP_24G, HP_16G of the horizontal direction corresponding to the plurality of reference grayscales. Although not shown in figures, the first luminance profile generator 230 may be configured to analyze the plurality of reference grayscale images and to generate a plurality of first luminance profiles of the vertical direction.

Figure 4:
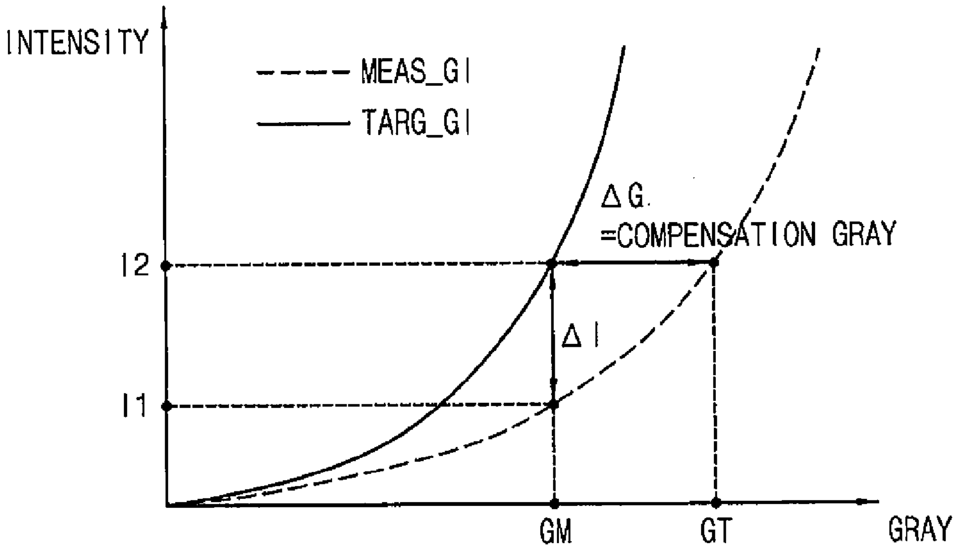
FIG. 4 is a conceptual diagram illustrating a gamma corrector of FIG. 1.

FIG. 4 is a conceptual diagram illustrating a gamma corrector of FIG. 1.

Referring to FIGS. 1 and 4, the gamma corrector 240 is configured to generate a measured gamma curve MEAS_GI of a central area CA in the display apparatus 100 using the plurality of first luminance profiles corresponding to the plurality of reference grayscales.

The measured gamma curve MEAS_GI is generated using the plurality of first luminance profiles of the plurality of reference grayscales corresponding to the central area CA. Referring to the measured gamma curve MEAS_GI, reference luminance levels corresponding to the plurality of reference grayscales, for example, 0-grayscale, 16-grayscale, 24-grayscale, 32-grayscale, 64-grayscale, 96-grayscale, 128-grayscale, 192-grayscale and 255-grayscale are obtained from the plurality of first luminance profiles of the plurality of reference grayscales and then, remaining luminance levels corresponding to remaining grayscales between the plurality of reference grayscales are obtained through interpolation (e.g., with an interpolation algorithm) using the reference luminance levels.

The gamma corrector 240 is configured to compare the measured gamma curve MEAS_GI and a target gamma TARG_GI which is preset, and to calculate the gamma correction value ΔG.

As shown in FIG. 4, a grayscale GM has a first luminance level l1 according to the measured gamma curve MEAS_GI and has a second luminance level l2 which is increased by a luminance difference Δl from the first luminance level l1 according to the target gamma curve TARG_GI. Thus, in order that the grayscale GM has the second luminance level l2 in measured gamma curve MEAS_GI, the grayscale GM is corrected into a target grayscale GT which is increased by a gamma difference ΔG.

Therefore, the gamma corrector 240 is configured to determine the gamma correction value ΔG of the display apparatus 100 into the gamma difference ΔG.

Figure 5:
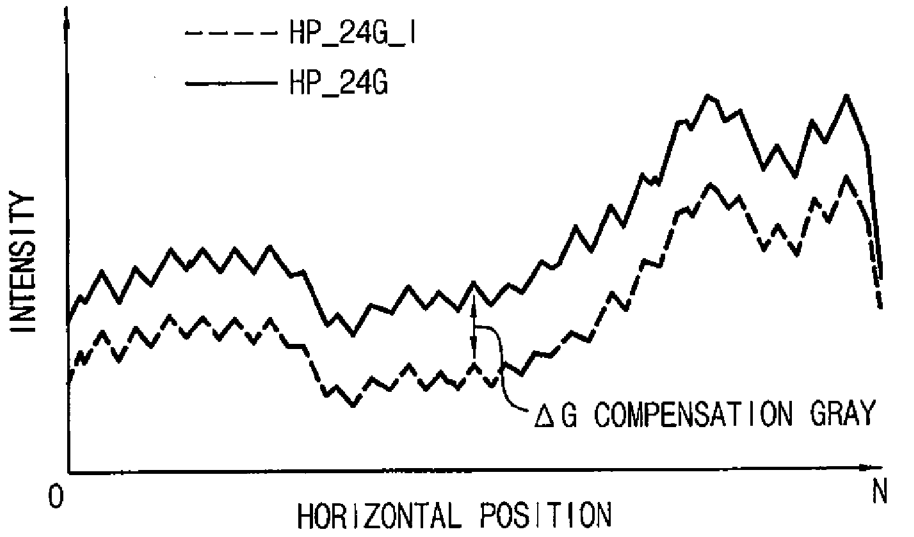
FIG. 5 is a conceptual diagram illustrating a second luminance profile generator of FIG. 1.

FIG. 5 is a conceptual diagram illustrating a second luminance profile generator of FIG. 1.

Referring to FIGS. 1 and 5, the second luminance profile generator 250 is configured to add the gamma correction value ΔG calculated from the gamma corrector 240 to each of the plurality of first luminance profiles generated from the first luminance profile generator 230 and to generate a plurality of second luminance profiles. Thus, the plurality of second luminance profiles is the same as a plurality of luminance profiles which is generated using a plurality of image signals captured from the plurality of reference grayscale images displayed on the display apparatus 100 compensating the gamma difference.

For example, as shown in FIG. 5, the second luminance profile generator 250 is configured to add the gamma correction value ΔG to a first luminance profile HP_24G of the 24-grayscale which is a reference grayscale and to generate a second luminance profile HP_24G_1 of the 24-grayscale.

As described above, the second luminance profile generator 250 is configured to generate a plurality of second luminance profiles corresponding to the plurality of reference grayscales. Although not shown in figures, the gamma correction value ΔG is applied to the plurality of first luminance profiles of the vertical direction and thus, a plurality of second luminance profiles of the vertical direction may be generated.

According to an exemplary embodiment, the plurality of second luminance profiles compensating the gamma difference is obtained using the plurality of first luminance profiles without having to display and capture a plurality of reference grayscale images compensating the gamma difference on the display apparatus. In comparison with related art processes for compensating the Mura defects, which includes an act of displaying a plurality of reference grayscale images to compensate a gamma difference and another act of capturing the reference grayscale images displayed on the display apparatus through the camera, the processes for compensating the Mura defects according to the exemplary embodiment may omit these two acts and thus, the processes for compensating the Mura defects according to the exemplary embodiment are more simple.

Figure 6A:
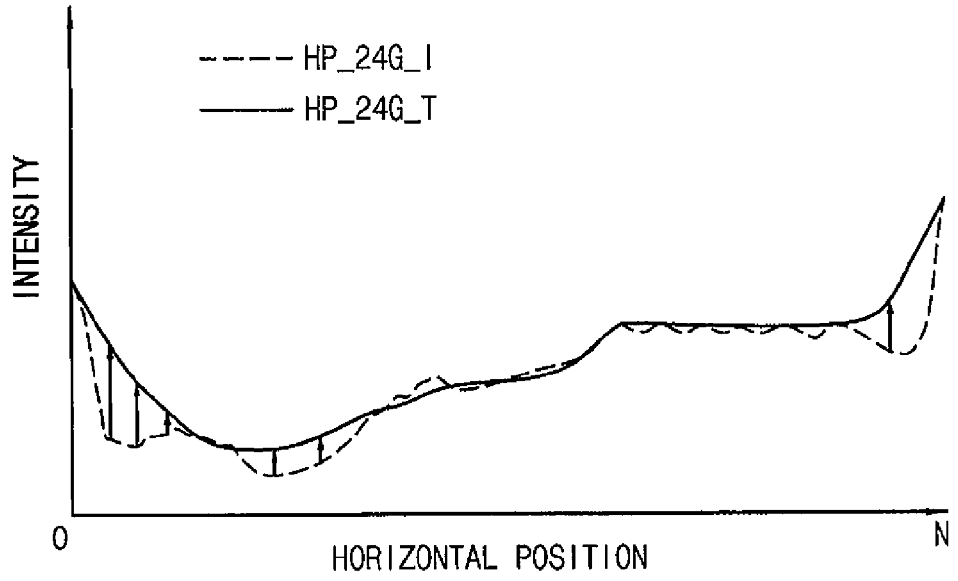
FIGS. 6A and 6B are conceptual diagrams illustrating a Mura corrector of FIG. 1.
Figure 6B:
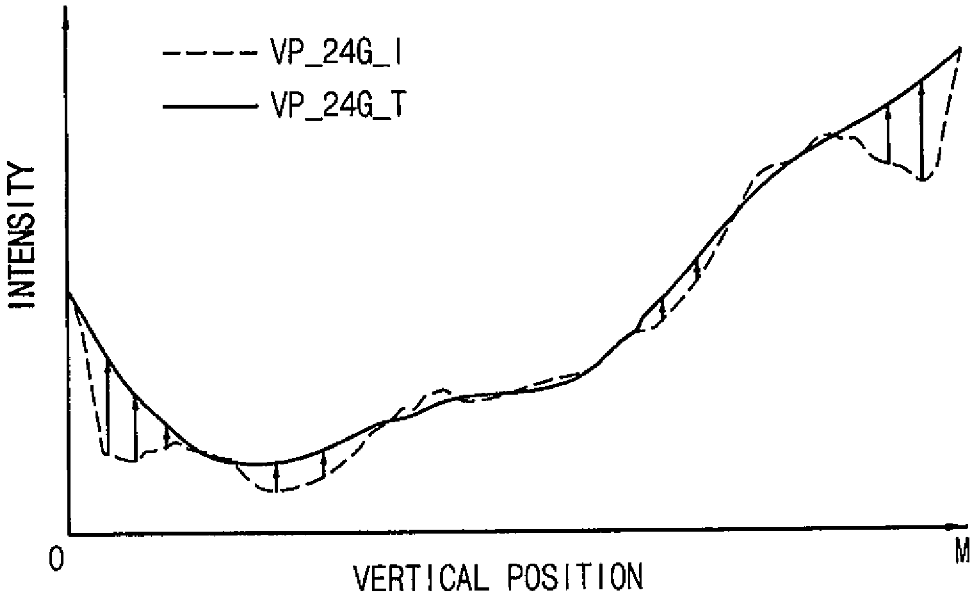

FIGS. 6A and 6B are conceptual diagrams illustrating a Mura corrector of FIG. 1.

Referring to FIGS. 1 and 6A, the Mura corrector 260 is configured to generate a target luminance profile for compensating the Mura defects. The Mura defects may include vertical Mura defects such as a vertical line and horizontal Mura defects such as the horizontal line. The target luminance profile may include a plurality of horizontal target luminance profiles and a plurality of vertical target luminance profiles corresponding to the plurality of reference grayscales.

The Mura corrector 260 is configured to calculate a plurality of horizontal Mura correction values corresponding to each of the plurality of reference grayscales using the plurality of second luminance profiles of the horizontal direction and the horizontal target luminance profiles.

For example, as shown in FIG. 6A, a plurality of horizontal Mura correction values corresponding to a plurality of pixel columns arranged in the horizontal direction is calculated using a second horizontal luminance profile HP_24G_1 and a horizontal target luminance profile HP_24G_T of the 24-grayscale. Thus, the plurality of horizontal Mura correction values of the 24-grayscale is calculated.

As described above, the Mura corrector 260 is configured to calculate a plurality of horizontal Mura correction values corresponding to each of the plurality of reference grayscales.

In addition, for example, as shown in FIG. 6B, a plurality of vertical Mura correction values corresponding to a plurality of pixel rows arranged in the vertical direction is calculated using a second vertical luminance profile VP_24G_1 and a vertical target luminance profile VP_24G_T of the 24-grayscale. Thus, the plurality of vertical Mura correction values of the 24-grayscale is calculated.

As described above, the Mura corrector 260 is configured to calculate the plurality of vertical Mura correction values corresponding to each of the plurality of reference grayscales.

According to an exemplary embodiment, a gamma compensating process for compensating a gamma difference of the display apparatus and a Mura compensating process for compensating Mura defects are performed using the plurality of reference grayscale images once captured from the camera. Thus, the gamma defect and Mura compensating processes may be simplified.

Figure 7:
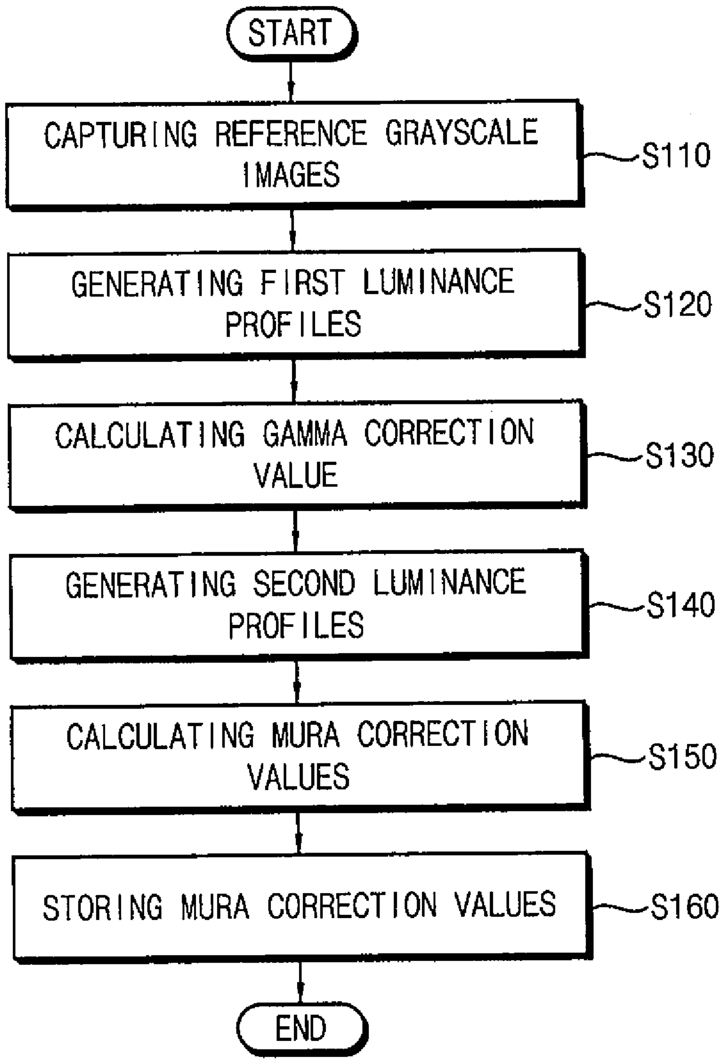
FIG. 7 is a flowchart illustrating a method of driving the vision inspection apparatus of FIG. 1.

FIG. 7 is a flowchart illustrating a method of driving the vision inspection apparatus of FIG. 1.

Referring to FIGS. 1 and 7, the inspection controller 210 is configured to display a plurality of reference grayscale images corresponding to a plurality of reference grayscales sampled from total grayscales on the display apparatus (e.g., the display panel) 100. For example, the sample grayscales may include 0-grayscale, 16-grayscale, 24-grayscale, 32-grayscale, 64-grayscale, 96-grayscale, 128-grayscale, 192-grayscale and 255-grayscale with respect to a total grayscale number of 256, but not being limited thereto.

The camera 220 is configured to capture each of the plurality of reference grayscale images displayed on the display apparatus 100 (Act S110).

The first luminance profile generator 230 is configured to analyze the plurality of reference grayscale images and to generate a plurality of first luminance profiles corresponding to the plurality of reference grayscales (Act S120). The first luminance profiles may include a plurality of luminance profiles corresponding to the plurality of reference grayscales with respect to at least one selected from a horizontal direction and a vertical direction of the display apparatus 100.

The gamma corrector 240 is configured to generate a measured gamma curve of a predetermined area, for example, a central area CA in the display apparatus 100 using the plurality of first luminance profiles corresponding to the reference grayscales. The gamma corrector 240 is configured to calculate a gamma correction value of the display apparatus 100 using the measured gamma curve and a target gamma curve which is preset (Act S130).

The second luminance profile generator 250 is configured to apply the gamma correction value to the plurality of first luminance profiles and to generate a plurality of second luminance profiles corresponding to the plurality of reference grayscales (Act S140). Thus, the plurality of second luminance profiles is the same as a plurality of luminance profiles which is generated using a plurality of image signals captured from the plurality of reference grayscale images displayed on the display apparatus 100 compensating the gamma difference.

The Mura corrector 260 is configured to calculate a plurality of Mura correction values respectively corresponding to the plurality of reference grayscales using the plurality of second luminance profiles and a plurality of target luminance profiles (Act S150).

The memory 270 is configured to store the plurality of Mura correction values corresponding to each of the plurality of reference grayscales calculated from the Mura corrector 260 (Act S160).

As described above, according to exemplary embodiments, a gamma compensating process for compensating a gamma difference of the display apparatus and a Mura compensating process for compensating Mura defects are performed using the plurality of reference grayscale images once captured through the camera. Thus, the gamma defect and Mura compensating processes may be simplified.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A vision inspection apparatus comprising:

a camera configured to capture a plurality of reference grayscale images corresponding to a plurality of reference grayscales displayed on a display apparatus;

a first luminance profile generator configured to generate a plurality of first luminance profiles corresponding to the plurality of reference grayscales;

a gamma corrector configured to calculate a gamma correction value of the display apparatus utilizing the plurality of first luminance profiles corresponding to the plurality of reference grayscales;

a second luminance profile generator configured to apply the gamma correction value to the plurality of first luminance profiles and to generate a plurality of second luminance profiles corresponding to the plurality of reference grayscales; and a Mura corrector configured to calculate a plurality of Mura correction values corresponding to the plurality of reference grayscales utilizing the plurality of second luminance profiles and a plurality of target luminance profiles.

2. The vision inspection apparatus of claim 1, wherein the gamma corrector is configured to generate a measured gamma curve of the display apparatus utilizing the plurality of first luminance profiles and to calculate the gamma correction value utilizing the measured gamma curve and a target gamma curve.

3. The vision inspection apparatus of claim 1, wherein the plurality of first luminance profiles corresponding to the plurality of reference grayscales comprise a luminance profile of at least one selected from a horizontal direction and a vertical direction of the display apparatus.

4. The vision inspection apparatus of claim 3, wherein the plurality of second luminance profiles corresponding to the plurality of reference grayscales comprise a luminance profile of at least one selected from a horizontal direction and a vertical direction of the display apparatus.

5. The vision inspection apparatus of claim 3, wherein the Mura corrector is configured to generate a plurality of horizontal Mura correction values utilizing the second luminance profiles of the horizontal direction corresponding to the reference grayscales and a plurality of horizontal target luminance profiles.

6. The vision inspection apparatus of claim 3, wherein the Mura corrector is configured to generate a plurality of vertical Mura correction values utilizing the second luminance profiles of the vertical direction corresponding to the reference grayscales and a plurality of vertical target luminance profiles.

7. The vision inspection apparatus of claim 1, further comprising:

a memory configured to store the plurality of Mura correction values corresponding to the reference grayscales.

8. A method of compensating a gamma defect and a Mura defect, the method comprising:

displaying a plurality of reference grayscale images respectively corresponding to a plurality of reference grayscales on a display apparatus;

generating a plurality of first luminance profiles corresponding to the plurality of reference grayscales utilizing each of the plurality of reference grayscale images displayed on the display apparatus;

calculating a gamma correction value of the display apparatus utilizing the plurality of first luminance profiles corresponding to the plurality of reference grayscales;

applying the gamma correction value to the plurality of first luminance profiles to generate a plurality of second luminance profiles corresponding to the plurality of reference grayscales; and calculating a plurality of Mura correction values corresponding to the reference grayscales utilizing the second luminance profiles and a plurality of target luminance profiles.

9. The method of claim 8, wherein the calculating the gamma correction value comprises:

generating a measured gamma curve corresponding to a central area of the display apparatus utilizing the plurality of first luminance profiles corresponding to the plurality of reference grayscales; and calculating the gamma correction value utilizing the measured gamma curve and a target gamma curve.

10. The method of claim 8, wherein the first luminance profiles corresponding to the reference grayscales comprise a luminance profile of at least one selected from a horizontal direction and a vertical direction of the display apparatus.

11. The method of claim 10, wherein the second luminance profiles corresponding to the reference grayscales comprise a luminance profile of at least one selected from a horizontal direction and a vertical direction of the display apparatus.

12. The method of claim 10, wherein the calculating the plurality of Mura correction values comprises:

generating a plurality of horizontal Mura correction values utilizing the second luminance profiles of the horizontal direction corresponding to the reference grayscales and a plurality of horizontal target luminance profiles.

13. The method of claim 10, wherein the calculating the plurality of Mura correction values comprises:

generating a plurality of vertical Mura correction values utilizing the second luminance profiles of the vertical direction corresponding to the reference grayscales and a plurality of vertical target luminance profiles.

14. The method of claim 8, further comprising:

storing the plurality of Mura correction values corresponding to the reference grayscales.

15. A system of compensating a gamma defect and a Mura defect, the system comprising:

means for displaying a plurality of reference grayscale images respectively corresponding to a plurality of reference grayscales on a display apparatus;

means for generating a plurality of first luminance profiles corresponding to the plurality of reference grayscales utilizing each of the plurality of reference grayscale images displayed on the display apparatus;

means for calculating a gamma correction value of the display apparatus utilizing the plurality of first luminance profiles corresponding to the plurality of reference grayscales;

means for applying the gamma correction value to the plurality of first luminance profiles to generate a plurality of second luminance profiles corresponding to the plurality of reference grayscales; and means for calculating a plurality of Mura correction values corresponding to the reference grayscales utilizing the second luminance profiles and a plurality of target luminance profiles.

* * * * *